(12) United States Patent
Bickley et al.

(10) Patent No.: US 8,991,186 B2
(45) Date of Patent: Mar. 31, 2015

(54) FUEL CONTROL SYSTEM WITH SERVO VALVE CONTROLLED WINDMILL RELIGHT MODE

(75) Inventors: Daniel James Bickley, Solihull (GB); Michael Griffiths, Bromsgrove (GB)

(73) Assignee: Rolls-Royce Engine Control Systems Limited, Derby (GB)

( * ) Notice: Subject to any disclaimer, the term of this patent is extended or adjusted under 35 U.S.C. 154(b) by 1148 days.

(21) Appl. No.: 12/963,049

(22) Filed: Dec. 8, 2010

(65) Prior Publication Data

US 2011/0146823 A1 Jun. 23, 2011

(30) Foreign Application Priority Data

Dec. 22, 2009 (GB) .................................. 0922349.6

(51) Int. Cl.
| | |
|---|---|
| F02C 7/262 | (2006.01) |
| F02C 7/232 | (2006.01) |
| F02C 9/26 | (2006.01) |
| F02C 9/46 | (2006.01) |
| F02C 9/28 | (2006.01) |
| F02C 9/32 | (2006.01) |

(52) U.S. Cl.
CPC . *F02C 9/26* (2013.01); *F02C 7/232* (2013.01); *F02C 7/262* (2013.01); *F02C 9/28* (2013.01); *F02C 9/32* (2013.01); *F02C 9/46* (2013.01); *F05D 2270/092* (2013.01); *F05D 2270/09* (2013.01); *F05D 2270/021* (2013.01)
USPC .............................................. 60/734; 60/233

(58) Field of Classification Search
CPC ............... F02C 7/262; F02C 9/32; F02C 9/46
USPC ................................................ 137/487, 487.5
See application file for complete search history.

(56) References Cited

U.S. PATENT DOCUMENTS

| | | | | |
|---|---|---|---|---|
| 4,473,999 | A * | 10/1984 | Smith | 60/39.281 |
| 5,086,617 | A * | 2/1992 | Smith | 60/39.281 |
| 5,927,064 | A | 7/1999 | Dyer et al. | |
| 6,176,076 | B1* | 1/2001 | Ford | 60/39.281 |
| 6,321,527 | B1 | 11/2001 | Dyer et al. | |
| 6,381,946 | B1* | 5/2002 | Wernberg et al. | 60/39.281 |

(Continued)

FOREIGN PATENT DOCUMENTS

| | | |
|---|---|---|
| EP | 0915241 A2 | 5/1999 |
| EP | 1785348 A2 | 5/2007 |

(Continued)

OTHER PUBLICATIONS

European Search Report for Priority Application No. 10252082.2. Dated Jun. 13, 2012.

*Primary Examiner* — William H Rodriguez
*Assistant Examiner* — Rene Ford
(74) *Attorney, Agent, or Firm* — Oliff PLC

(57) ABSTRACT

A fuel control system comprises a metering valve operable to control the flow of fuel between a supply line and a delivery line, a spill valve operable to control fuel flow within the supply line, a pressure raising valve connected to the delivery line, and a control servo valve movable between a thrust control mode in which it modifies the control of the spill valve to reduce the fuel flow delivered via the metering valve and an outlet of the pressure raising valve, and a windmill relight position in which it modifies the control of the pressure raising valve to allow fuel delivery through the outlet of the pressure raising valve at a reduced system pressure.

10 Claims, 1 Drawing Sheet

(56) References Cited

U.S. PATENT DOCUMENTS

| | | |
|---|---|---|
| 6,401,446 B1 | 6/2002 | Gibbons |
| 6,619,027 B1 | 9/2003 | Busch |
| 6,745,556 B2 | 6/2004 | Elliott |
| 7,137,242 B2 | 11/2006 | Griffiths |
| 7,234,293 B2 * | 6/2007 | Yates et al. ................. 60/39.281 |
| 7,386,981 B2 * | 6/2008 | Zielinski et al. ................ 60/772 |
| 8,511,414 B2 * | 8/2013 | O'Shea ........................ 180/69.4 |

FOREIGN PATENT DOCUMENTS

| | | | |
|---|---|---|---|
| EP | 2199572 A2 | 6/2010 | |
| EP | 2295767 A2 | 3/2011 | |
| GB | 2305975 | 4/1997 | |
| GB | 2305975 A * | 4/1997 | ............... F02C 9/26 |
| WO | 2005116419 A1 | 12/2005 | |

\* cited by examiner

FUEL CONTROL SYSTEM WITH SERVO VALVE CONTROLLED WINDMILL RELIGHT MODE

BACKGROUND

This invention relates to a fuel control system and in particular to a fuel control system for use in controlling the supply of fuel to an aircraft engine.

A typical fuel control system for use in controlling the supply of fuel to an aircraft engine comprises a metering valve operable to control the rate at which fuel passes from a supply line to a delivery line. A pressure drop control arrangement, for example comprising a pressure drop control valve and an associated spill valve, is operable to maintain a substantially constant pressure drop across the metering valve. A pressure raising and shut-off valve (PRSOV) controls the passage of fuel from the delivery line to a burner manifold, the PRSOV serving, in use, to maintain a minimum fuel pressure in a part of the fuel control system upstream thereof, so as to ensure that any fuel pressure operated devices arranged to receive fuel under pressure from the fuel control system can operate correctly.

The fuel control system receives fuel under pressure from a pumping unit that is driven by, and so operates at a speed related to the operating speed of, the associated engine. There is a need to provide, within the fuel control system, a mechanism whereby thrust can be controlled in the event of an overthrust condition arising. A number of thrust control management, commonly known as thrust control malfunction, (TCM) systems to perform this function are known. For example U.S. Pat. No. 6,745,556 describes a TCM system in which a control valve is operable to relieve the fuel pressure applied to one end of a metering valve with the result that the metering valve moves to a low or minimum fuel delivery position to allow fuel supply to the associated engine burner to be reduced in the event that an overspeed condition is sensed. The control valve, in this arrangement, is a torque motor controlled valve.

Rather than control thrust by altering the operation of a metering valve when an overthrust condition is sensed, another approach involves modifying the operation of the spill valve so as to limit the fuel flow delivered to the engine via the metering valve and PRSOV, or to use other control valves to limit this flow. For example, one of the arrangements described in U.S. Pat. No. 7,137,242 uses ports provided on a staging valve to allow the pressure at the inlet of the metering valve to be reduced in the event of an overspeed condition being sensed. U.S. Pat. No. 6,619,027 describes an arrangement in which an electrically controlled servo valve allows the operation of the spill valve to be modified, and in which the operation of a shut-off valve can be controlled.

U.S. Pat. No. 5,927,064 describes a fuel system incorporating an overspeed governor to control the operation of a spool valve in response to engine speed and thereby control or manage overspeed conditions.

As well as permitting thrust control, another requirement of the fuel control system is to ensure that sufficient fuel can be delivered to the engine under windmill relight conditions in which the engine is rotating only very slowly, being driven by the airflow incident thereon.

As mentioned hereinbefore, the pumping unit is driven for rotation at a speed related to the operating speed of the associated engine. During windmill relight conditions the engine speed maybe as low as, for example, 5% of its maximum operating speed. At such low operating speeds, parasitic losses within the fuel control system and in the pumping unit itself may result in the pumping unit being unable to deliver sufficient fuel, in the time available, to permit relighting of the engine. In order to increase the fuel delivery rate, it is known to use a larger displacement pump, but the required increase in size and weight of the pumping unit makes this unattractive.

Rather than increase the pump output to ensure that the required flow to the burners is achieved which increases the parasitic leakage losses in the system, another known technique involves adjusting the system pressure rise during start-up and windmill relight conditions, for example by modifying the pressures applied to the PRSOV so that the PRSOV will open at a lower pressure during start-up and windmill relight conditions and the parasitic leakage losses will be reduced. The PRSOV reverts to its normal mode of operation under other engine operating conditions. For example, U.S. Pat. No. 6,321,527 describes arrangements in which the pressure acting upon a minimum pressurising valve urging it towards a closed position is dependent upon the operation of either a solenoid operated control valve or the operation of a pressure regulating valve. Other arrangements in which the operation of the PRSOV is modified to allow a reduction in system pressure rise at start-up or under windmill relight conditions are described in U.S. Pat. No. 7,234,293 and U.S. Pat. No. 6,176,076.

SUMMARY

It is an object of the invention to provide a fuel control system whereby thrust control management and windmill relighting can be achieved in a simple and convenient manner.

According to the present invention there is provided a fuel control system comprising a metering valve operable to control the flow of fuel between a supply line and a delivery line, a spill valve operable to control fuel flow within the supply line, a pressure raising valve connected to the delivery line, and a control servo valve movable between a thrust control mode in which it modifies the control of the spill valve to reduce the fuel flow delivered via the metering valve and an outlet of the pressure raising valve, and a windmill relight position in which it modifies the control of the pressure raising valve to allow fuel delivery through the outlet of the pressure raising valve at a reduced system pressure.

The control servo valve is preferably electromagnetically operated. For example it may include a torque motor operable to drive a jet/nozzle arrangement.

The spill valve preferably includes a control chamber, and the control servo valve is preferably operable, when in its thrust control position, to relieve the pressure within the control chamber. A pressure drop control valve may further be provided, operable to vary the spill valve control chamber pressure to maintain a substantially constant pressure drop across the metering valve in normal use. The spill valve maybe a combining spill valve, operable to control the supply of fuel to the supply line from a plurality of fuel pumps. However other arrangements, including single pump arrangements, are possible.

The pressure raising valve preferably comprises a pressure raising and shut-off valve (PRSOV). It preferably includes a PRSOV control chamber to which fuel under pressure is supplied, the control servo valve being operable to relieve the fuel pressure within the PRSOV control chamber when in its windmill relight position.

Preferably the control servo valve is further movable to a test position in which high pressure fuel is applied to the PRSOV control chamber to close the PRSOV. A position sensor associated with the PRSOV can be used to determine whether or not the required movement has taken place, and hence to confirm that the control servo valve is operating as expected. Alternatively, a dedicated position sensor associated with the control servo-valve could be used to confirm that this valve is operating correctly.

BRIEF DESCRIPTION OF THE DRAWINGS

The invention will further be described, by way of example, with reference to the accompanying drawings, in which.

DETAILED DESCRIPTION OF THE EMBODIMENTS

Figure 1:
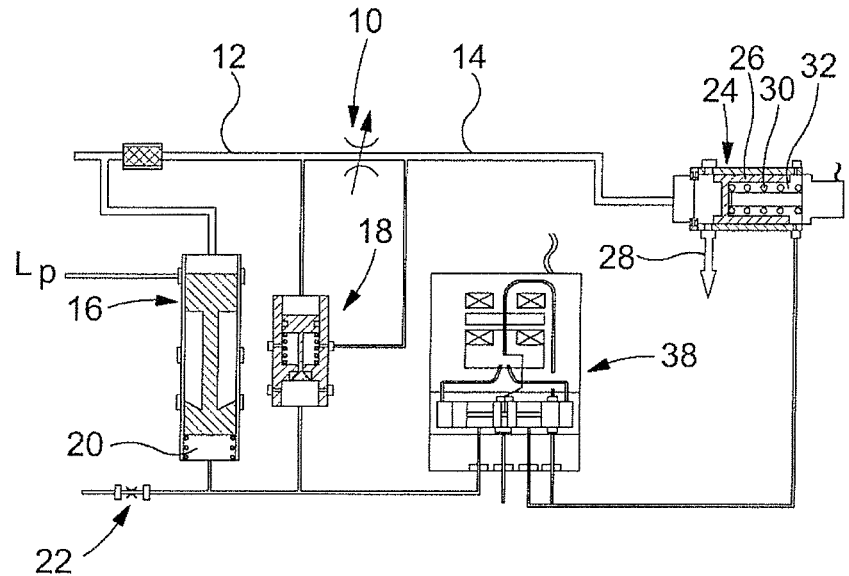
FIG. 1 is a diagram illustrating part of a fuel system in accordance with one embodiment of the invention.

The fuel system illustrated diagrammatically in FIG. 1 comprises a metering valve 10 operable to control the rate at which fuel is allowed to flow from a supply line 12 to a delivery line 14. The supply line 12 is connected to the outlet of a high pressure fuel pumping unit (not shown) which may take a range of forms. For example, the pumping unit could comprise a gear pump arrangement or, alternatively, could comprise one or more vane pumps. The fuel system illustrated in FIG. 1 is designed for use with a gear pump arrangement of the type in which two gear pumps are provided, one of which supplies fuel directly to the supply line 12, the output of the other of the gear pumps being supplied to the supply line 12 only when there is a high demand for fuel. However, it will be appreciated that other forms of pumping unit may be provided and the invention is not restricted in this regard.

A spill valve 16 is connected to the supply line 12 and is operable to allow fuel to pass from the supply line 12 to the low pressure side of the fuel pumping unit. The spill valve 16 is a combining spill valve and further serves to control whether or not the output from the second gear pump is supplied to the supply line 12. Combining spill valves are of well known form and so the manner in which it operates to achieve this function is not described herein.

A pressure drop control valve 18 monitors the pressure drop across the metering valve 10 and controls the fuel pressure applied to a spill valve control chamber 20 of the spill valve 16 to control the operation of the spill valve 16. The manner in which the pressure drop control valve 18 operates is such that, if the pressure drop across the metering valve 10 is greater than a predetermined value, then the pressure drop control valve 18 reduces the fuel pressure within the spill valve control chamber 20. By reducing the fuel pressure within the spill valve control chamber 20, the spill valve 16 opens to allow fuel flow to be diverted from the supply line 12 to the low pressure side of the pumping unit at an increased rate, thereby reducing the fuel flow through, and hence the pressure drop across, the metering valve 10. If the pressure drop across the metering valve 10 becomes too small, then the operation of the pressure drop control valve 18 is such that the fuel pressure within the spill valve control chamber 20 will rise by virtue of a restricted connection 22 to high pressure. The increase in the fuel pressure within the spill valve control chamber 20 urges the spill valve 16 towards a closed position reducing the rate at which fuel flow is diverted from the supply line 12 to the low pressure side of the pumping unit with the result that the fuel flow through, and hence the fuel pressure drop across, the metering valve 10 increases.

Figure 2:
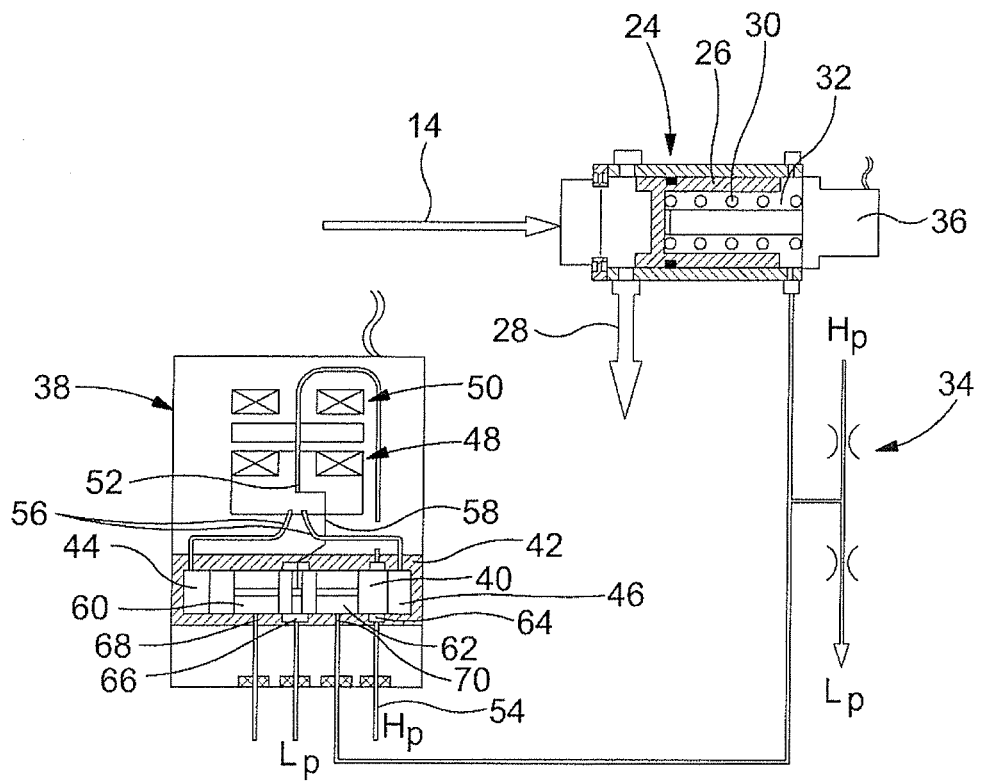
FIG. 2 is an enlarged view illustrating part of the fuel system of FIG. 1.

A pressure raising and shut-off valve (PRSOV) 24 is connected to the delivery line 14. The PRSOV 24 comprises a valve member 26 slidable within a bore between a closed position in which the PRSOV 24 prevents fuel delivery from the delivery line 14 to a line 28 connected to the burner manifold of an associated engine, and an open position in which such fuel flow is permitted. The valve member 26 is biased by a spring 30 towards the closed position. The PRSOV 24 further comprises a PRSOV control chamber 32 to which fuel at a pressure governed by a fuel pressure potentiometer network 34 is supplied, as illustrated in FIG. 2. It will be appreciated that the fuel pressure within the PRSOV control chamber 32 assists the spring 30 in urging the valve member 26 towards its closed position. A position sensor 36 in the form of an inductive probe is operable to sense the position of the valve member 26. In normal use, the PRSOV 24 serves to ensure that the fuel pressure within the delivery line 14, and hence the parts of the fuel system upstream thereof, is maintained at above a predetermined minimum level. The level at which the minimum pressure is set is dependent upon the forces applied to valve member 26 urging the valve member 26 in its closing direction. By ensuring that a predetermined minimum pressure level is maintained in the fuel control system, it will be appreciated that the correct operation of any fuel pressure operated auxiliary devices that receive fuel under pressure from the fuel control system can be maintained.

As outlined hereinbefore, it is desirable to be able to ensure that engine control can be maintained in the event of, for example, an overthrust condition in which fuel is delivered to the burner manifold at a rate higher than is desired. It is also desired to provide a mechanism whereby sufficient fuel can be delivered to the burner manifold under windmill relight conditions at which the engine is rotating at a relatively low speed.

In order to provide this functionality, in accordance with the invention the fuel control system includes a control servo valve 38. This control servo-valve could comprise any one of a number of known electro-magnetically actuated progressive type valve arrangements, such as a torque motor actuated flapper, nozzle and spool valve arrangement or a progressive solenoid actuated clevis type valve arrangement. The preferred embodiment of the valve described hereafter is a two stage servo-valve comprising a torque motor actuated jet and nozzle first stage and a spool valve second stage.

The control servo valve 38 comprises a spool 40 slidable within a bore formed in a housing 42. The spool 40 defines, with the housing 42 first and second chambers 44, 46, the fuel pressures within which are determined by the operation of an electro-magnetic controller 48. The electro-magnetic controller 48 comprises a torque motor 50 operable to vary the position of a jet 52 supplied with fuel at high pressure from a line 54. The jet 52 is movable such that fuel under high pressure therefrom can be directed towards one or other of a pair of nozzles 56 associated with respective ones of the chambers 44, 46. In use, when the torque motor 50 is operated to move the jet 52 towards the left as illustrated in FIG. 2, it will be appreciated that the fuel pressure within the chamber 44 will rise thereby urging the spool 40 towards the right, fuel from the chamber 46 escaping therefrom to permit such movement. Operation of the torque motor 50 to urge the jet 52 in the opposite direction will result in movement of the spool 40 in the reverse direction.

The use of a jet and nozzle first stage is advantageous in that it ensures that the second stage spool valve is maintained in a mid-position, commonly referred to as a null position, during normal operation of the fuel control system. Further, blockage of the first stage jet and nozzle assembly by, for example, fuel borne debris does not result in the second stage spool 40 being forced away from the null position.

A resilient feedback spring 58 is connected between the jet 52 and the spool 40, the spring 58 being arranged to move the jet 52 to a position related to the position of the spool 40 when the torque motor 50 is not energised with the result that the de-energisation of the torque motor 50 results in the spool 40 being restored to a null position as described below. The feedback spring 58 is selected such that, when the torque motor 50 is energised, the feedback spring 58 can flex to allow movement of the spool 40 independently of the jet 52. Instead of using a feedback spring 58, connected between the jet 52 and the spool 40, to provide null-position resetting functionality in the design of the control servo-valve 38, separate resilient springs could be added to both ends of the spool 40, located in the respective chambers 44, 46, to provide the same functionality.

One of the advantages of using the form of control servo-valve 38 described above is that the second stage spool valve is actively controlled in a mid-position rather than being hard over on an end stop. Since the control servo-valve 38 only operates occasionally during flight, it is advantageous to have the second stage dithering around a control point, rather than being static, so as to avoid seizure due to silting or lacquering.

The spool 40 is provided with first and second annular galleries 60, 62, with high and low pressure connection ports 64, 66 connected, respectively, to parts of the fuel system at high and low pressure, with a port 68 connected to the spill valve control chamber 20, and with a port 70 connected to the PRSOV control chamber 32. The positioning of the ports and the dimensions of the annular galleries 60, 62 are such that the gallery 60 is in constant communication with the port 68 and the gallery 62 is in constant communication with the port 70 irrespective of the position of the spool 40. When spool 40 occupies its null position as shown in FIG. 2, the high and low pressure ports 64, 66 are closed, and the galleries 60, 62 communicate only with the respective ports 68, 70. In this position of the spool 40, it will be appreciated that the control servo valve 38 has no effect upon the operation of the fuel control system. In this mode of operation, the pressure drop control valve 18 serves to maintain a substantially uniform pressure drop across the metering valve 10, controlling the operation of the spill valve 16 to achieve this, and the PRSOV 24 operates to maintain the fuel pressure within the control system at above a minimum pressure value. The metering valve 10 operates to control the rate at which fuel is delivered by the fuel control system to the manifold of the associated engine and thus controls the operation of the associated engine.

If it is determined that fuel is being delivered to the associated engine at too great a rate with the result that an overthrust condition has arisen, then the control servo valve 38 may be used to reduce the rate of fuel supply independently of the operation of the metering valve 10. In order to achieve this, the control servo valve 38 is operated in a thrust control mode in which the spool 40 is moved to a thrust control position by controlling the operation of the torque motor 50 to move the jet 52 towards the left as illustrated, thereby increasing the fuel pressure within the chamber 44 and causing movement of the spool 40 to the right in the orientation illustrated. The movement of the spool 40 and jet 52 in opposite directions results in the spring 58 being stressed, and the position of the jet 52 will be dependent upon both the level of the current applied to the torque motor 50 and the force exerted by the spring 58. Provided the spool 40 moves only by a relatively small distance, then the movement of the spool results in communication being established between the gallery 60 and the low pressure port 66 with the result that the fuel pressure within the spill valve control chamber 20 is relieved. Reduction of the fuel pressure within the spill valve control chamber 20 results in the spill valve 16 moving in the opening direction, increasing the rate at which fuel is able to escape from the supply line 12 to the low pressure side of the pump, and hence reducing the rate at which fuel flows from the supply line 12 to the delivery line 14 through the metering valve 10. The rate at which fuel is supplied to the associated engine is thus also reduced. The overthrust condition can thus be appropriately managed. Further, by appropriate control of the torque motor 50, the spool position and hence the degree of communication between the gallery 60 and the low pressure port 66 can be controlled, thus the fuel pressure within the spill valve control chamber 20, and hence the operation of the spill valve 16 can be controlled to achieve fuel delivery to the associated engine at a desired rate.

During this mode of operation, the gallery 62 remains isolated from the high and low pressure ports 64, 66 and so operation of the PRSOV is unchanged.

In an extreme condition, or if testing of the operation of the fuel control system is taking place, then the torque motor 50 may be controlled in such a manner as to move the spool 40 to an extreme right hand, test position in which not only is communication established between the gallery 60 and the low pressure port 66, but also communication is established between the gallery 62 and the high pressure port 64. In such circumstances, it will be appreciated that high pressure fuel is supplied from a high pressure line 54 via the high pressure port 64, the gallery 62 and the port 70 to the PRSOV control chamber 32, increasing the fuel pressure therein to a level higher than is achieved by the normal operation of the fuel pressure potentiometer network 34. Increasing of the fuel pressure within the PRSOV control chamber 32 in this manner results in the force urging the valve member 26 thereof towards its closed position being increased to a level sufficient to move the valve member 26 to its closed position thereby terminating the delivery of fuel to the associated engine manifold. The movement of the valve member 26 is sensed by the sensor 36 and can thus be used to provide an indication that the control servo valve 38 is operating correctly. It is recognised that the control servo-valve 38 could be designed such that in the thrust control mode it is capable of opening the spill valve 16 far enough to reduce the system pressure rise to a level that prevents the PRSOV from opening at start-up. Hence, the high pressure port 64 and line 54 would not be required to test the operation of the control servo-valve 38. Alternatively, a dedicated position sensor associated with the control servo-valve 38 could be used to confirm correct operation. With a dedicated position sensor the high pressure port 64 and line 54 would no longer be required. Further, the described two-stage control servo-valve 38 could be replaced by an arrangement comprising a single stage servo-valve in the form of, for example, a torque motor actuated flapper and nozzle assembly, which controls an independent second stage spool valve. The dedicated position sensor negates the need for a feedback spring 58.

In either case, either the thrust control mode or test mode of operation, when the spool 40 has been moved as a result of the operation of the torque motor 50, upon de-energisation of the torque motor 50 the spring 58 will force the jet 52 to move to a position related to the position of the spool 40. As a result of such movement, it will be appreciated that fuel under high pressure is delivered by the jet 52 to the other of the nozzles 56 with the result that the fuel pressure within the chamber 46 is increased, moving the spool 40 towards the left. This spool movement results in the spring 58 forcing the jet 52 to return to a null position between the two nozzles 56. When the spool 40 reaches its null position, as illustrated in FIG. 2, spool movement will cease as the pressures applied to the chambers 44, 46 will be substantially equal.

A further advantage of the thrust control mode of operation of the control servo-valve 38 is that the low pressure port 66 is closed and the pressure in the PRSOV control chamber 32, and consequently the minimum system pressure rise, is set by the fuel pressure potentiometer network 34 at a relatively high level. This ensures correct operation of fuel pressure operated auxiliary devices, and in particular engine variable geometry actuators, during an overthrust event. This would somewhat offset the reduction in system pressure rise that would be expected if the cause of the overthrust was an upward runaway of the metering valve 10.

In the event of the fuel control system and associated engine being in a windmill relight condition in which the engine is turning at only a very low speed, for example as low as 5% of its maximum normal operating speed, then it will be appreciated that the output of the pump arrangement will be very low. In order to minimise parasitic losses which are related to system pressure, and to assist in ensuring that sufficient fuel is able to be delivered to the associated engine to achieve relighting, the control servo valve 38 may be moved to a windmill relight position by controlling the operation of the torque motor 50 to move the jet 52 to the right in the orientation illustrated, increasing the fuel pressure within the chamber 46 and consequently resulting in movement of the spool 40 to the left. The movement of the spool 40 to the left results in communication being established between the gallery 62 and the low pressure port 66 thus resulting in the fuel pressure within the PRSOV control chamber 32 being relieved, reducing the fuel pressure therein to a level lower than that achieved by the normal operation of the fuel pressure potentiometer network 34. By relieving the fuel pressure within the control chamber 32 in this manner, it will be appreciated that the PRSOV 24 is able to open when the fuel pressure within the control system is at a lower level than that at which the PRSOV 24 would usually open. As a result, windmill relighting is more easily achieved.

Once relighting of the engine has been completed, the torque motor 50 may be de-energised. Upon de-energisation of the torque motor 50 the spring 58 will force the jet 52 to move to a position related to the position of the spool 40. As a result of such movement, fuel under high pressure is delivered by the jet 52 to the other of the nozzles 56 with the result that the fuel pressure within the chamber 44 is increased, moving the spool 40 towards the right. This results in the spring 58 forcing the jet 52 to return to a null position between the two nozzles 56. When the spool 40 reaches its null position, as illustrated in FIG. 2, spool movement will cease as the pressures applied to the chambers 44, 46 will be substantially equal. The return of the spool 40 to its null position results in the control system operating substantially as hereinbefore with the PRSOV control chamber 32 being at a pressure determined by the operation of the fuel pressure potentiometer network 34 and with the spill valve control chamber 20 being pressurised to a degree controlled by the operation of the pressure drop control valve 18.

Use of the windmill relight position of the control servo-valve 38 as described above can be extended to not only provide a windmill relight capability. If this position is used as the normal operating position of the control servo-valve 38, a relatively low minimum system pressure rise of say 200 psid can be set during normal engine operating conditions. This would be advantageous from a heat rejection standpoint as the heat added to the fuel by the action of spilling excess fuel flow from the supply line 12 to the low pressure side of the fuel pumping unit via the spill valve 16 through this pressure drop is minimised. This would enable an improvement in the design of the engine oil/fuel heat management system and also reduce the amount of fuel degradation, commonly referred to as lacquering, that typically occurs in the high temperature environment of an aircraft engine fuel control system.

The disadvantage of having a relatively low minimum system pressure rise during normal engine operating conditions is that there may be insufficient pressure for correct operation of any fuel pressure operated auxiliary devices. In particular there may be insufficient fuel pressure to move engine variable geometry actuators or turbine case cooling system actuators at the required slew rate. This can be overcome by moving the control servo-valve 38 to its aforementioned null position during actuator transient conditions. This would result in the low pressure port 66 being closed and the pressure in the PRSOV control chamber 32, and consequently the minimum system pressure rise, being set by the fuel pressure potentiometer network 34 at a higher level, typically anywhere between 250 and 500 psid. This higher minimum system pressure rise is sufficient to move the actuators at the required slew rate during transient conditions, whilst heat input to the fuel can be minimised by returning the control servo-vale 38 to the aforementioned windmill relight position when movement of the actuators is no longer required. Further, it may only be necessary to increase the minimum system pressure rise during movement of the actuators when the resistive loads are highest. For example during extend movement of the actuators the lower pressure rise may be sufficient.

It will be appreciated that the torque motor control of the control servo-valve 38 may be achieved in a number of ways. One possibility is that when the current applied thereto is in the range −50 to −30 mA, the torque motor 50 will move the spool 40 to its windmill relight position, an applied current in the range of −20+15 mA will result in the spool 40 occupying its null position, an applied current in the range of +20 to +35 mA will result in the spool 40 operating in the thrust control mode and so occupying one of its thrust control positions, and an applied current in the range of +40 to +50 mA moves the spool 40 to its test position. As mentioned above, in the thrust control mode of operation the spool position may be adjusted by varying the applied current to control the spill valve control chamber pressure and thereby achieve proportional control over the fuel delivery rate. Likewise, in the windmill relight mode of operation the position of the spool 40 may be adjusted by varying the applied current to partially open or close the low pressure port 66 and thereby achieve proportional control of the minimum system pressure rise at windmill relight and, if necessary, other engine start-up conditions. Further, since as mentioned hereinbefore, the windmill relight position of the control servo-valve 38 can be used as the normal operating mode of the system, proportional control of the minimum system pressure rise can be achieved at all engine operating conditions.

It will be appreciated that the arrangement of the invention is advantageous in that both overthrust control and windmill relighting functionality can be provided in a simple and convenient manner, utilising a single servo control valve to provide both functions. As the windmill relighting functionality is electro magnetically controlled, other operating modes of the engine are not altered by the presence of this functionality.

Further, it is recognised that with the aforementioned proportional control of the control servo-valve 38 in all modes of operation and the fact that the minimum system pressure rise settings at a given position of the spool 40 are known, simpler and more accurate pressure compensation algorithms can be incorporated into the position control loop software for the metering valve 10 and also the aforementioned fuel pressure operated auxiliary devices such as engine variable geometry actuators and turbine case cooling system actuators.

A wide range of modifications and alterations may be made to the arrangement described hereinbefore without departing from the scope of the invention. For example, the minimum system pressure rise scheduling described above could be achieved with the use of a separate control valve to that used for overthrust control and windmill relight.

The invention claimed is:

1. A fuel control system comprising:
   a metering valve operable to control the flow of fuel between a supply line and a delivery line;
   a spill valve operable to control fuel flow within the supply line;
   a pressure raising valve connected to the delivery line;
   a pressure drop control valve, wherein the pressure drop control valve is operable to vary a spill valve control chamber pressure to maintain a substantially constant pressure drop across the metering valve; and
   a control servo valve capable of switching between a thrust control position in which it modifies the control of the spill valve in order to reduce the fuel flow, a windmill relight position in which it modifies the control of the pressure raising valve to allow fuel delivery through an outlet of the pressure raising valve at a reduced system pressure, and a null position between the thrust control position and the windmill relight position, in the null position, the control servo valve effecting no modification of the control of the spill valve and no modification of the control of the pressure raising valve.

2. The system according to claim 1, wherein the control servo valve is electromagnetically operated.

3. The system according to claim 2, wherein the control servo valve includes a torque motor operable to drive a jet and nozzle arrangement.

4. The system according to claim 1, wherein the spill valve includes a control chamber, and the control servo valve in its thrust control position, relieves the pressure within the control chamber.

5. The system according to claim 4, wherein the spill valve is a combining spill valve, operable to control the supply of fuel to the supply line from a plurality of fuel pumps.

6. The system according to claim 1, wherein the pressure raising valve comprises a pressure raising and shut-off valve (PRSOV).

7. The system according to claim 6, wherein the PRSOV includes a PRSOV control chamber to which fuel under pressure is supplied, the control servo valve, in its windmill relight position, relieving the fuel pressure within the PRSOV control chamber.

8. The system according to claim 6, wherein the control servo valve is further movable to a test position in which high pressure fuel is applied to the PRSOV control chamber to close the PRSOV.

9. The system according to claim 8, further comprising a position sensor associated with the PRSOV and operable to determine whether or not the required movement has taken place, and hence to confirm that the control servo valve is operating as expected.

10. The system according to claim 1, further comprising a dedicated position sensor associated with the control servo valve and operable to confirm that the control servo valve is operating correctly.

* * * * *

UNITED STATES PATENT AND TRADEMARK OFFICE
CERTIFICATE OF CORRECTION

PATENT NO. : 8,991,186 B2
APPLICATION NO. : 12/963049
DATED : March 31, 2015
INVENTOR(S) : Bickley et al.

Page 1 of 1

It is certified that error appears in the above-identified patent and that said Letters Patent is hereby corrected as shown below:

On the Title Page, Item 73 in the Assignee section, "Rolls-Royce Engine Control Systems Limited" should be ---Rolls-Royce Controls and Data Services Limited---.

Signed and Sealed this
Fifth Day of July, 2016

Michelle K. Lee
*Director of the United States Patent and Trademark Office*